Patented Apr. 1, 1941

2,236,796

UNITED STATES PATENT OFFICE 2,236,796

PROCESS FOR THE SYNTHESIS OF CHLORINATED SATURATED AND UNSATURATED HYDROCARBON OILS

Herman B. Kipper, Accord, Mass.

No Drawing. Application September 13, 1938, Serial No. 229,674

4 Claims. (Cl. 134—56)

Applicant has carried out considerable investigation of condensation of olefinic gases, more especially represented by propylene, the butylenes and amylenes, but not including the lowest member of the series, namely ethylene, with unsaturated petroleum hydrocarbons and chlorinated unsaturated petroleum hydrocarbons, also in conjunction with acetylene and carbon monoxide. He has found that oils made by such processing are suitable for drying oils or surface coatings more especially if mixed with ten to twenty percent of vegetable oils.

When using the oils synthesized, as noted, as surface coating oils, chlorinated petroleum hydrocarbons, and chlorinated hydrocarbons produced from condensed olefinic gases were also incorporated. Applicant has used such chlorinated petroleum oils, both saturated and unsaturated, in paint compositions during experimentation carried out for the past few years and found greatly enhanced stability of the pigmented coatings containing such chlorinated oils.

The oils now used by applicant as raw materials were produced from olefinic gases by the use of metal chlorides as well as fluorides. Applicant used more especially stannic chloride, antimony chloride and mixtures of these with zinc chloride. These oils were chlorinated by him and such chlorinated oils were used to increase the viscosity and weathering quality of his surface coating compositions. Chlorination was produced by simply passing chlorine through these oils. From five to twenty percent of chlorine was used. Naturally, lower or higher percentages might be employed. The oils must be kept cold during chlorination. Applicant has maintained these at about zero degrees centigrade in this work to prevent discoloration or blackening. The hydrochloric acid gas formed and not evolved during chlorination and hence contained within the chlorinated oil was neutralized with anhydrous ammonia.

Chlorination was also produced by passing chlorine directly into the reaction chamber during the process of synthesis of these oils.

The reaction chamber utilized by applicant was made up of a chrome-nickel-iron alloy tube about six feet long, one and three-eighths inches internal diameter, two and three-eighths inches external diameter. The tube was heated by electric resistance furnaces, although specifically in the present syntheses practically no heating was employed, except in the earlier stages of the experimental work.

The catalysts were placed in the reaction chamber in suitable boats made out of porcelain and also of a chrome-nickel-iron alloy. The chamber was then closed and the olefinic gases were forced into it by means of nitrogen.

As an example of one of the syntheses ten grams of stannic chloride and ten grams of zinc chloride were mixed and placed in four small porcelain boats, which in turn were placed in two of the larger alloy boats and the latter were then inserted into the reaction chamber. After closing of the same five hundred grams of olefines, mostly butylenes, cooled to zero degrees C., were forced into the reaction chamber by means of nitrogen until the gauge pressure registered one hundred and fifty pounds. About fifty grams of chlorine were then forced into the reaction chamber, about ten grams per hour, over a five hour period. The tube was allowed to stand twenty-four hours and opened. About eighty percent of the raw materials were recovered as a thick viscous oil. The acidity of the latter was neutralized with anhydrous ammonia. The oil was then filtered through glass wool.

An oil was produced from olefines, mostly butylenes, which were forced into the reaction tube by means of ethylene up to about two hundred pounds pressure. Otherwise the operation was carried out as in the chlorination run but without the addition of chlorine. This oil was treated with chlorine, as already described, at zero degrees. About ten percent was used. Anhydrous ammonia was employed for neutralization of the residual free acid left in the oil.

At about seventy degrees also the oil under strong stirring was treated with chlorine, about eight percent, and simultaneously with fuming nitric acid, about fifteen percent. Chlorination and simultaneous oxidation were also made with chlorine and hydrogen peroxide, as well as with sodiumoxychloride at about forty degrees. In the latter case free chlorine was also passed into the oil. Chlorine used on the basis of oil was about ten percent, about half as free chlorine. Likewise hydrochloric acid, of about forty percent strength, as well as hydrochloric acid gas, were used for chlorination in conjunction with nitric acid and with hydrogen peroxide at about seventy degrees for simultaneous chlorination and oxidation. The oxidants were used in excess proportions, that is, for both oxidation of the hydrochloric acid and partial oxidation of the oil. At least twice the weight of the oxidant was used to that required for the hydrochloric acid oxidation. Especial care must be taken that the oils are not allowed to rise too high or further in temperature than the temperatures already noted. The bad features of these oxidation and chlorination steps are that water is formed in and emulsified with the oil under the powerful stirring employed. By addition of calcium chloride, either in sufficient amount to remove the water while the said chloride is still in the solid state, or to give a strong brine with the water and with the aid of centrifugal force the water may be practically eliminated but the step is a very considerable additional nuisance. Sodium chloride was also used in place of calcium chloride for water removed by the second step mentioned.

Probably the best method of producing the unsaturated chlorinated hydrocarbons of the type under consideration would be according to the processing described in my application Serial No. 89,463, but applicant has not yet produced these oils in sufficient quantity to apply such processing to them. A far larger amount of oil is required for such experimental processing than that needed for the other oxidation steps just described.

These oils, more especially in the presence of ammonium chloride, formed in the oils as noted, represent good drying or polymerization oils when used with pigments in surface coatings or, that is, in paints or as pigment vehicles. Applicant has used these oils with other chlorinated petroleum oils and also with vegetable drying oils, as linseed, tung and soya bean oils as well as with the so-called paint thinners, both from petroleum and coal tar sources. He has also used them with unsaturated petroleum oils, produced by selective oxidation of fuel oils, gas oil, etc. For pigments, he has used titanium oxide, "Titanox," white lead, lithopone, ferric oxide, red lead, Prussian and ultramarine blues and chrome green and yellows. From fifty to three hundred percent of pigments on weight of oil were employed.

As a polymerizant or dryer, applicant has used ammonium chloride more especially, as described in a number of his applications now pending. He has also used the hydrochloric acid salts of ethyl- and methylamines, etc., as also described in the said applications pending. Naturally, the oxidized chlorinated oils show an enhanced drying speed over the straight chlorinated oils when used in paint films or pigmented surface coatings.

One percent or higher percentages of ammonium chloride on weight of oil were employed.

Work is now in progress of condensing olefinic gases with resins, as colophony resin, copal, gum elemi, dammar and likewise with drying oils, as linseed, tung and soya bean oils.

In further conjunction with this condensation work on olefines applicant has also succeeded in producing an artificial rubber. For the latter condensation the reaction tube containing the olefinic gases was filled with about fifteen percent of acetylene on weight of olefines, mostly butylenes. Antimony pentachloride and copper chloride, mixed in about equal proportions, was the best catalyst used for the condensations. Zinc and stannic chlorides were also used. Five to ten percent of a chlorinated rubber on the weight of the catalyst served as a catalytic activator.

In the reaction tube, filled with olefinic gases at room temperature and containing some four catalytic combinations in as many small boats, heating occurred directly above the combination containing the chlorinated rubber, whereas the other three combinations showed no apparent heating. The high activating tendency of the chlorinated rubber was thereby well established.

The acetylene-olefinic condensations were carried out at about minus twenty-five to thirty degrees C. and allowed to take place during the period of a week.

Vulcanization of the rubber can be readily carried out with sulphur chloride or with sulphur. A very small percentage of piperidine and thiourea were employed with the sulphur and vulcanization was carried out also at a hundred and fifty degrees.

Also olefinic gases, mostly butylenes, were cooled below minus twenty-five degrees (lower limit of thermometer, dry ice was used as the cooling medium) and finally divided cuprene about fifteen percent was added to the liquefied gases. The moistening of the cuprene with a small percentage of soya bean oil and admixture to it of a small percentage of ammonium and copper chlorides was found advantageous. Under stirring and with maintenance of the low temperature, one to two percent of antimony pentachloride was then added as a catalytic material. The oil at once began to thicken and stirring was continued until the viscosity had considerably increased, when the oil was allowed to stand at the low temperature for fuller polymerization over a twenty-four hour period. The fairly tough rubber-like material produced was vulcanized as above described. A far better and fuller vulcanization was obtained with this product than with that produced with acetylene. Soft and hard rubbers were produced depending on the percentage of sulphur employed. With forty percent of sulphur, a harder plastic was formed.

I claim:

1. In a process for the production of viscous chlorinated hydrocarbon oils, the step of chlorinating the oils produced from the condensation of olefinic gases by means of hydrolyzing metal chlorides.

2. In a process for the production of viscous chlorinated hydrocarbon oils, the step of chlorinating the oils produced from the condensation of olefinic gases by means of hydrolyzing metal chlorides and the step of neutralizing the hydrochloric acid reactionally produced and dissolved in the synthesized oils by means of anhydrous ammonia.

3. In a process for the production of viscous chlorinated hydrocarbon oils, the step of chlorinating and simultaneously oxidizing the oils produced from the condensation of olefinic gases by means of hydrolyzing metal chlorides.

4. In a process for the production of viscous chlorinated hydrocarbon oils, the step of chlorinating by means of chlorine gas and simultaneously oxidizing by means of nitric acid the oils produced from the condensation of olefinic gases by means of hydrolyzing metal chlorides.

HERMAN B. KIPPER.